(12) United States Patent
Xie et al.

(10) Patent No.: US 7,876,322 B2
(45) Date of Patent: Jan. 25, 2011

(54) METHOD AND APPARATUS FOR FAST AND EFFICIENT MESH SIMPLIFICATION

(75) Inventors: Hui Xie, Plainsboro, NJ (US); Lingyun Liu, Elmhurst, NY (US); Tong Fang, Morganville, NJ (US)

(73) Assignee: Siemens Corporation, Iselin, NJ (US)

( * ) Notice: Subject to any disclaimer, the term of this patent is extended or adjusted under 35 U.S.C. 154(b) by 889 days.

(21) Appl. No.: 11/466,204

(22) Filed: Aug. 22, 2006

(65) Prior Publication Data

US 2007/0120851 A1    May 31, 2007

Related U.S. Application Data

(60) Provisional application No. 60/742,503, filed on Dec. 5, 2005, provisional application No. 60/740,366, filed on Nov. 29, 2005, provisional application No. 60/742,440, filed on Dec. 5, 2005.

(51) Int. Cl.
*G06T 17/00* (2006.01)
(52) U.S. Cl. ....................................................... 345/428
(58) Field of Classification Search ................ 345/428, 345/423
See application file for complete search history.

(56) References Cited

U.S. PATENT DOCUMENTS

| 4,912,664 | A | * | 3/1990 | Weiss et al. ................. 716/20 |
| 5,440,674 | A | | 8/1995 | Park |
| 5,448,687 | A | * | 9/1995 | Hoogerhyde et al. ........ 345/423 |
| 5,929,860 | A | * | 7/1999 | Hoppe ........................ 345/419 |
| 5,963,668 | A | * | 10/1999 | Horikawa et al. ........... 382/203 |
| 6,169,549 | B1 | * | 1/2001 | Burr ............................ 345/419 |
| 6,208,347 | B1 | * | 3/2001 | Migdal et al. ............... 345/419 |
| 6,262,737 | B1 | * | 7/2001 | Li et al. ...................... 345/419 |
| 6,603,473 | B1 | * | 8/2003 | Litke et al. .................. 345/420 |
| 6,996,505 | B1 | * | 2/2006 | Edelsbrunner et al. ......... 703/2 |

FOREIGN PATENT DOCUMENTS

WO    01/48699 A1    7/2001

OTHER PUBLICATIONS

Park et al., "An adaptive method for smooth surface approximation to scattered 3rd points" Computer Aided Design, Elsevier Publishers Bv., Barking, GB, vol. 27, No. 12, pp. 929-939, Dec. 1995.

(Continued)

*Primary Examiner*—Xiao M Wu
*Assistant Examiner*—Edward Martello

(57) ABSTRACT

A method and apparatus for the simplification of a mesh surface is disclosed that preserves the original geometry of the shape of the surface and, at the same time, reduces undesirable triangle geometries. In one embodiment, a mesh simplification process first determines whether an edge swap operation should be performed as a function of a threshold criteria. Such a threshold may be a function of the span angles and cross angles associated with an edge or, alternatively, may be a predetermined span angle size threshold. In another embodiment, the decision as to whether to contract an edge is made by comparing the size of at least one span angle with a span angle threshold and by comparing the sizes of incident angles associated with the edge to an incident angle threshold.

9 Claims, 6 Drawing Sheets

OTHER PUBLICATIONS

Hattandagy, "A fast, topolog manipulation algorithm for compaction of mesh/faceted models", Computer Aided Design, Elsevier Publishers Bv., Barking, GB, vol. 30, No. 10, Sep. 1998, pp. 835-843.

Hoppe, "Mesh optimization", Computer Graphics Proceedings, Proceedings of Siggrah Annual International Conference on Computer Graphics and Interactive Techniques, Aug. 1, 1993, pp. 19-26.

D. Levin, "Mesh-Independent Surface Interpolation", Geometric Modeling for Scientific Visualization, Edited by Brunnett, Hamann and Mueller, Springer-Verlag, 2003, pp. 37-49.

F. Bernardini, et al., "The Balt-Pivoting Algorithm for Surface Reconstruction", IEEE Transactions on Visualization and Computer Graphics, 1999.

Y. Chen, et al., "Filleting and Rounding Using a Point-Based Method", Proc. of DETC'05, 2005 ASME Design Engineering Technical Conferences and Computers and Information in Engineering Conference, Long Beach, CA, Sep. 24-28, 2005, pp. 1-10.

T. Igarashi, et al., "Smooth Meshes for Sketch-Based Freeform Modeling", Proc. of the 2003 Symposium on Interactive 3D Graphics, Monterey, CA, 2003, pp. 139-142.

M. Desbrun, et al., "Implicit Fairing of Irregular Meshes Using Diffusion and Curvature Flow". Proc. of the 28th Annual Conference on Computer Graphics and Interactive Techniques, 1999, pp. 317-324.

T. Jones, et al., "Non-Iterative, Feature-Preserving Mesh Smoothing", ACM Transactions on Graphics (TOG), Proc. of ACM SIGGRAPH, vol. 22, Issue 3, Jul. 2003. pp. 943-949.

L. Kobbelt, "Discrete Fairing and Variational Subdivision for Freeform Surface Design", The Visual Conputer, 2000, pp. 142-158.

S. Fleishman, et al., "Bilateral Mesh Denoising", ACM Transactions on Graphics TOG), Proc. of ACM SIGGRAPH, vol. 22, Issue 3, Jul. 2003, pp. 950-953.

W. Press, et al., "Numerical Recipes in C: The Art of Scientific Computing". Cambridge, Cambridge University Press, 1989, pp. 59-71.

G. Taubin, "A Signal Processing Approach to Fair Surface Design", IBM T.J. Watson Research Center, ACM Press, New York, NY, 1995.

* cited by examiner

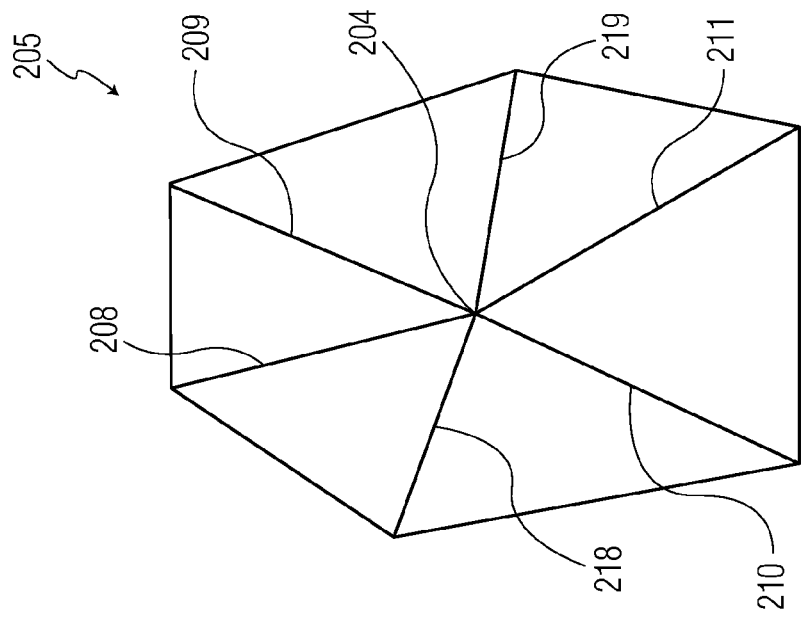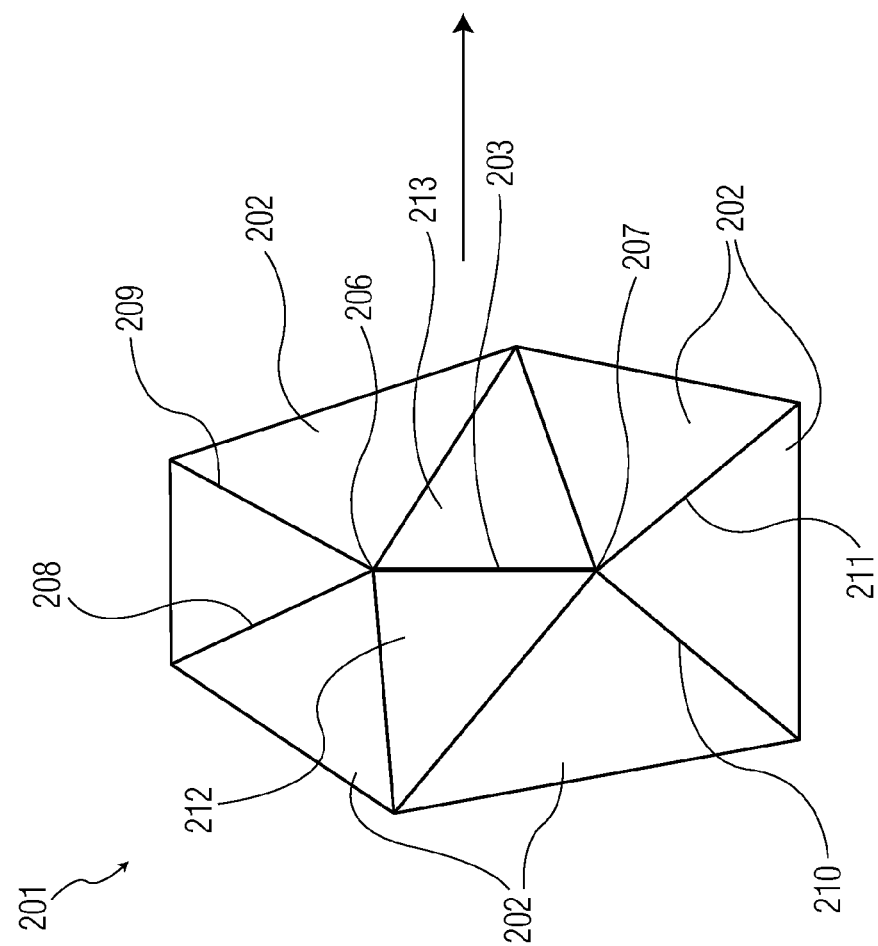

METHOD AND APPARATUS FOR FAST AND EFFICIENT MESH SIMPLIFICATION

This patent application claims the benefit of U.S. Provisional Application No. 60/742,503, filed Dec. 5, 2005, which is hereby incorporated by reference herein in its entirety.

CROSS-REFERENCE TO RELATED APPLICATIONS

The present application is also related to U.S. Pat. application Ser. No. 11/466,194, titled Method and Apparatus for Non-Shrinking Mesh Smoothing Using Local Fitting; and U.S. patent application Ser. No. 11/466,211, now U.S. Pat. No. 7,623,127, titled Method and Apparatus for Discrete Mesh Filleting and Rounding Through Ball Pivoting, both of which are being filed simultaneously herewith and are hereby incorporated by reference herein in their entirety.

BACKGROUND OF THE INVENTION

The present invention relates generally to two- and three-dimensional mesh shapes and, more particularly, to the simplification of the meshes on the surfaces of such shapes.

Many applications, such as medical and industrial design and manufacturing applications, involve manipulating and editing a digital model of an object. As one skilled in the art will understand, such a digital model may be created by scanning an object to create a point cloud representation of the object. The surface of such a model of a scanned object typically consists of a plurality of points, the number of which is a function of the resolution of the scanning process. Once such a point cloud representation has been obtained, the surface of the object may then be approximated by connecting the points of the point cloud to form a plurality of geometric shapes, such as triangles, on the surface of the model. This model may then, for example, be edited by using computer aided design (CAD) software programs or similar specialized image manipulation software programs.

FIG. 1 shows an illustrative model of the surface 101 of such an object. Referring to that figure, points 103 are, illustratively, the points in a point cloud that are obtained from the scanning of the object. Then, as discussed above, well-known methods are used to connect the points in a way such that the surface of the object is approximated by a plurality of triangles 102, referred to herein collectively as a triangle mesh. One such method for constructing a surface by connecting points and forming triangles is described, for example, in F. Bernardini et al.,*The Ball-Pivoting Algorithm for Surface Reconstruction*, IEEE Transactions on Visualization and Computer Graphics, 5(4), October-December, 1999, pp. 349-359, which is hereby incorporated by reference herein in its entirety. Many other methods for creating mesh surfaces have also been developed and are well-known.

As one skilled in the art will recognize, there is an inherent tradeoff between the accuracy of the approximation of a surface and the complexity of the triangle mesh used for the approximation. Specifically, a mesh consisting of a large number of relatively small triangles will typically produce a more accurate surface approximation. However, the larger the number of triangles, the greater the volume and complexity of the computations required to create and edit the surface. Therefore, as one skilled in the art will also recognize, it is thus advantageous to balance the complexity of the mesh surface with the computational cost to produce an accurate surface model while, at the same time, reducing the associated cost of creating and editing the model. To achieve such a balance, mesh simplification algorithms have been developed to simplify mesh models and, therefore, reduce the aforementioned computational costs while at the same time retaining satisfactory accuracy.

Prior attempts at simplifying a triangle mesh surface have involved either local or global methods, As one skilled in the art will recognize, local methods attempt to simplify a mesh by treating discrete portions of a mesh individually while, on the other hand, global methods attempt to simplify the mesh by treating the entire mesh as a whole. Global methods involve, for example, minimizing an error function that ranks all of the possible mesh simplification steps and then performs them, illustratively, in order according to the identified rank (i.e., starting with those steps that alter the geometry of the mesh the least). Given the larger number of triangles in meshes of complex objects, global methods require a relatively large number of computations to rank the simplification steps and then reconstruct a simplified mesh surface of a model. On the other hand, local methods require less computations since fewer points/triangles in a mesh are to be simplified at any one time. As one skilled in the art will recognize, local methods of mesh simplification are greedy algorithms in that they attempt to find a locally optimum choice (here, a mesh simplification choice) at each stage of the algorithm. The goal of such algorithms is to attempt to determine the global optimal solution to mesh simplification based on local results. Since local algorithms do not consider the entire set of triangles in the mesh, however, such a global optimal solution is typically not achieved. However, while such local algorithms typically do not result in the global optimal solution, they typically provide satisfactory approximations of such a solution. Therefore, since the computational cost of such local methods is typically much lower than global methods, and the results of such methods are adequate for most applications, many attempts at mesh simplification have relied on such local methods.

Different local mesh simplification methods are known. One class of such methods, known as vertex decimation methods, function by removing vertices of triangles and then reconstructing the surface of the model to fill in the resulting gap in the surface left by the deleted vertex. However, such methods can be undesirable since such surface reconstruction requires a reconstruction of the entire mesh surface once one or more vertices of local triangles have been deleted. Thus, the computational cost of such methods is relatively high.

Another local mesh simplification method, referred to herein as edge contraction, also functions to reduce the number of vertices in a mesh. Unlike the vertex decimation technique, the edge contraction method does not delete the vertices and, therefore, create gaps in the mesh that require reconstruction of the surface. Instead, such edge contraction methods operate by identifying a target edge to be contracted and, then, by moving one or both of the two endpoints of the target edge to a single position. According to this method, and as discussed further herein below, all edges incident to the original vertices of the contracted edge are thus linked at this single position Any triangle faces that have degenerated into lines or points are then removed.

FIGS. 2A and 2B show an example of how edge contraction can be used to simplify a 2D or 3D surface approximated by a triangle mesh. Specifically, referring to those figures, surface 201 is a surface of an object characterized by a mesh of triangles 202. Each of the triangles 202 is characterized by having three vertices and three edges connecting those vertices. As discussed above, during edge contraction, one edge, such as edge 203 between vertices 206 and 207, is contracted in a way such that vertex 206 and vertex 207 are moved to the same position. The result of such a contraction is shown in FIG. 2B. Specifically, edge 203 is contracted so that vertex 206 and vertex 207 are positioned at position 204 in FIG. 2B. As a result, triangle faces 212 and 213 are transformed into edges 218 and 219 in FIG. 2B. Also, all incident edges to vertices 206 and 207, such as edges 208, 209, 210 and 211, now meet at new vertex 204. Thus, the resulting mesh is simplified by the consolidation of two vertices into a single vertex and the removal of two triangle faces from the mesh surface.

A key determination in edge contraction operations is how to contract the edge into a single vertex and, more particularly, where vertex 204 should be positioned in the model after the contraction is completed. Typical prior efforts selected one of the vertices, such as vertex 206 in FIG. 2A, and then contracted edge 203 in a way such that the position of vertex 204, which combined vertices 206 and 207 together, was at the position of prior vertex 206. Alternatively, an average of the position of vertices 206 and 207 was determined and the new vertex 204 was positioned at that average position.

SUMMARY OF THE INVENTION

The present inventors have recognized that, while prior methods for the simplification of a mesh surface are advantageous in many regards, they are also disadvantageous in certain respects. Specifically, while prior edge contraction methods would produce a simplified mesh surface (i.e., having fewer triangles and vertices), they could undesirably alter the original geometry of the model. In addition, such prior methods could often result in undesirable triangle geometries, such as overly-thin triangles, as a part of the mesh after simplification was performed. Such thin triangles having, for example, one very large vertex angle and one-or more very small vertex angles, are undesirable since they tend to introduce excessive errors in algorithms requiring robust numerical computations associated with the editing or manipulation of a mesh.

Accordingly, the present inventors have invented a method for simplification of a mesh surface that preserves the original geometry of the shape of the surface and, at the same time, reduces undesirable triangle geometries, such as the aforementioned thin triangles. More particularly, in accordance with an embodiment of the invention, a mesh simplification process first determines whether an operation, referred to herein as an edge swap operation and discussed further herein below, is desired. In a first embodiment such a determination is made as a function of a comparison of the size of span angles associated with an edge with the size of cross angles associated with that edge. In a second embodiment, this determination is made by the comparison of the size of at least one span angle with a span angle threshold. In accordance with another embodiment, a determination is next made whether to contract the edge. This determination may be made, illustratively, by referring to the comparison of the size of span angles associated with the edge with the size of cross angles associated with that edge. Alternatively, in yet another embodiment, the decision as to whether to contract an edge is made by comparing the size of at least one span angle with a span angle threshold and by comparing the sizes of incident angles associated with the edge to an incident angle threshold. Based on the foregoing comparisons, the edges on a triangle mesh surface are swapped and/or contracted so as to advantageously simplify that surface while maintaining a desired accuracy in the mesh representation of that surface.

These and other advantages of the invention will be apparent to those of ordinary skill in the art by reference to the following detailed description and the accompanying drawings.

BRIEF DESCRIPTION OF THE DRAWINGS

FIGS. 2A and 2B show an illustrative mesh surface having an edge to be considered for mesh simplification;

DETAILED DESCRIPTION

Figure 1:
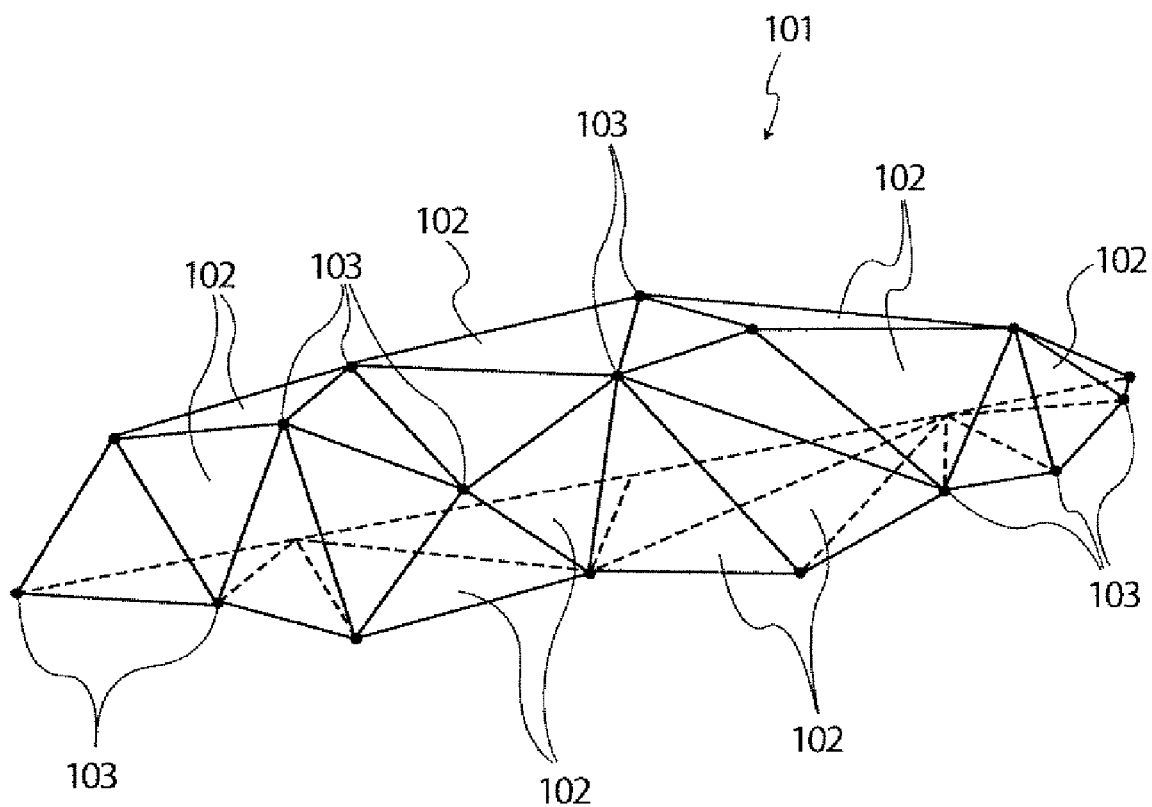
FIG. 1 shows a model of a 3D shape having a triangle mesh surface.
Figures 3A, 3B:
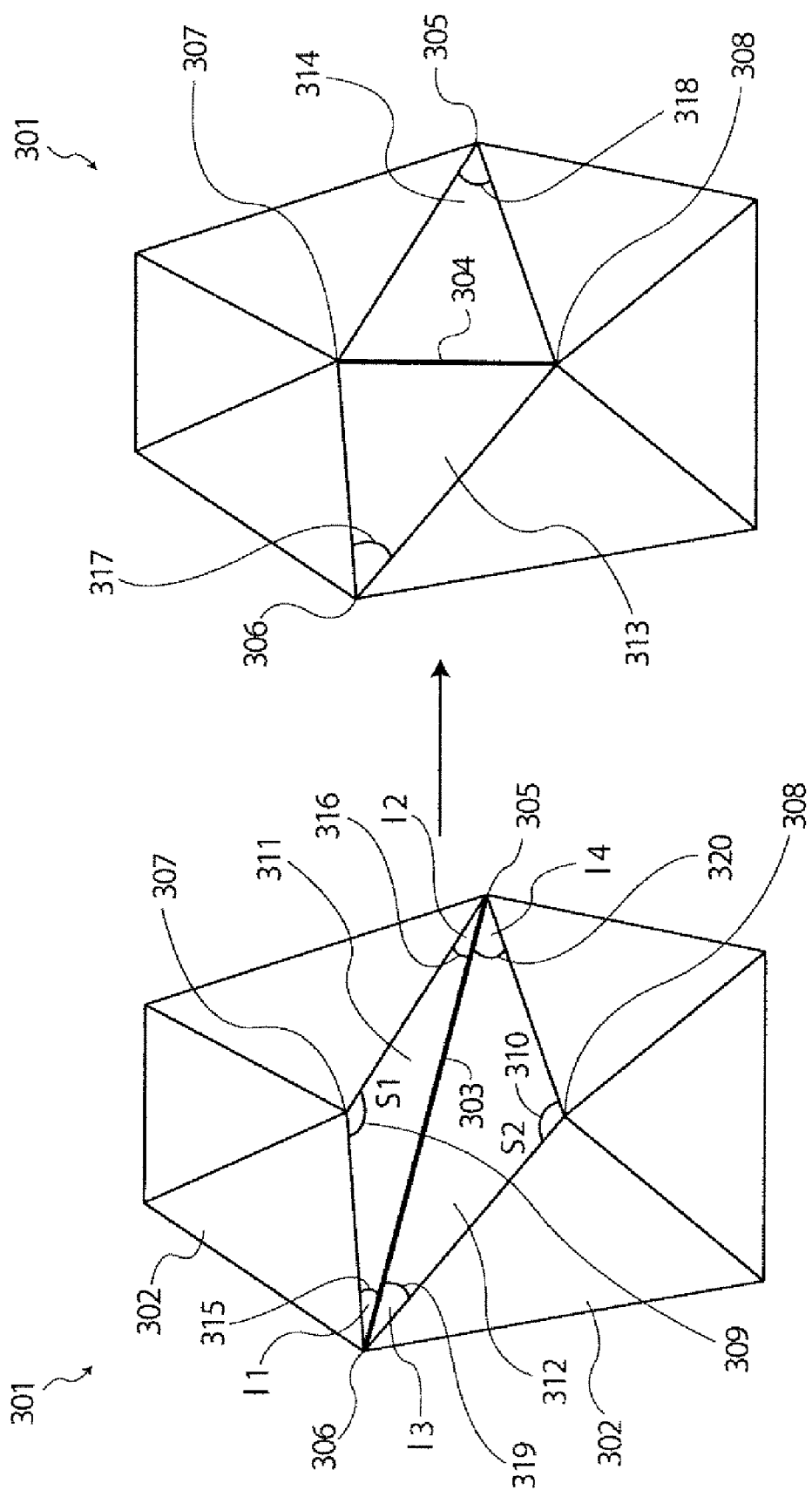
FIGS. 3A and 3B show a second illustrative mesh surface having an edge to be considered for mesh simplification.

The present inventors have recognized that it may be desirable in some instances to determine whether an edge swap is desirable either prior to or in place of an edge contraction operation. FIGS. 3A and 3B show an example of an illustrative edge swap operation that is useful for reducing undesirable geometry features that are present in a triangle mesh, such as thin triangles, while, at the same time, preserving an accurate approximation of the surface of the object represented by the triangle mesh. Specifically, referring to those figures, illustrative surface 301 is a mesh surface comprising a mesh of triangles 302. These triangles 302 are, as discussed above, each characterized by three edges connecting three vertices, for example edge 303 connecting vertices 305 and 306. Edge 303 has span angle S1 309 associated with vertex 307 and span angle S2 310 associated with vertex 308. As shown in FIG. 3A, triangles 311 and 312 having common edge 303 are characterized in that they are thin, i.e., they have relatively large span angles S1 309 and S2 310 and small incident angles I1 315 and I2 316 (in triangle 311) and I3 319 and I4 320 (in triangle 312). As discussed above, thin triangles are typically undesired since the existence of such triangles tends to lead to a total increased number of triangles in the mesh which, for example, increases the computation cost of mesh simplification operations. Alternatively, such thin triangles may lead to inaccuracy in the numerical computations necessary to perform various operations, such as editing operations, on the respective mesh surface. Therefore, in accordance with an embodiment of the present invention and as shown in FIG. 3B, an edge swap may be performed to eliminate these undesirable thin triangles Specifically, referring to FIG. 3B, such an edge swap is accomplished by removing edge 303 and replacing that edge with edge 304 in FIG. 3B between vertices 307 and 308. As can be seen by reference to FIG. 3B, such a swap eliminates thin triangles 311 and 312 and, instead, creates more desirable triangles 313 and 314, i.e., which have vertex angles closer to being equal than do triangles 310 and 311 that existed before the swap.

As discussed above, the present inventors have discovered that it is desirable to consider whether one or both an edge swap or an edge contraction should be performed on an edge. In order to make this determination, various criteria may be used. Illustratively, in accordance with a first embodiment of the present invention, threshold criteria are defined for both span angles S1 309 and S2 310, and incident angles I1 315, I2

316, I3 319 and I4 320. More particularly, according to one embodiment, let a first cross angle C1 between triangles 311 and 312 on either side of common edge 303 be defined as:

$$C1 = I1 + I3 \quad \text{(Equation 1)}$$

and a second cross angle C2 between those triangles be defined as:

$$C2 = I2 + I4 \quad \text{(Equation 2)}$$

Then, the determination whether to perform an edge swap or an edge contraction may be performed according to the expressions:

$$S1+S2 > C1+C2 \Rightarrow \text{swap edge} \quad \text{(Equation 3)}$$

and $$S1+S2 < C1+C2 \Rightarrow \text{contract edge} \quad \text{(Equation 4)}$$

where, once again S1 and S2 are span angles of an edge and C1 and C2 are the cross angles associated with that same edge.

Referring to FIG. 3A, assume that the following angles of that figure have the following values:

TABLE 1

Values for angles for consideration of edge swap

| Angle | Value |
| --- | --- |
| S1 309 | 135 degrees |
| S2 310 | 120 degrees |
| I1 315 | 20 degrees |
| I2 316 | 20 degrees |
| I3 319 | 30 degrees |
| I4 320 | 35 degrees |

Thus, according to Table 1 and the foregoing equations, S1+S2=255 degrees total. C1=I1+I3=20 degrees+30 degrees=50 degrees and C2=I2+I4=20 degrees+35 degrees=55 degrees. Thus, C1+C2=50 degrees+55 degrees=105 degrees total. Therefore, S1+S2>C1+C2 and, as a result, edge 303 should be swapped as per Equation 3.

Figure 4:
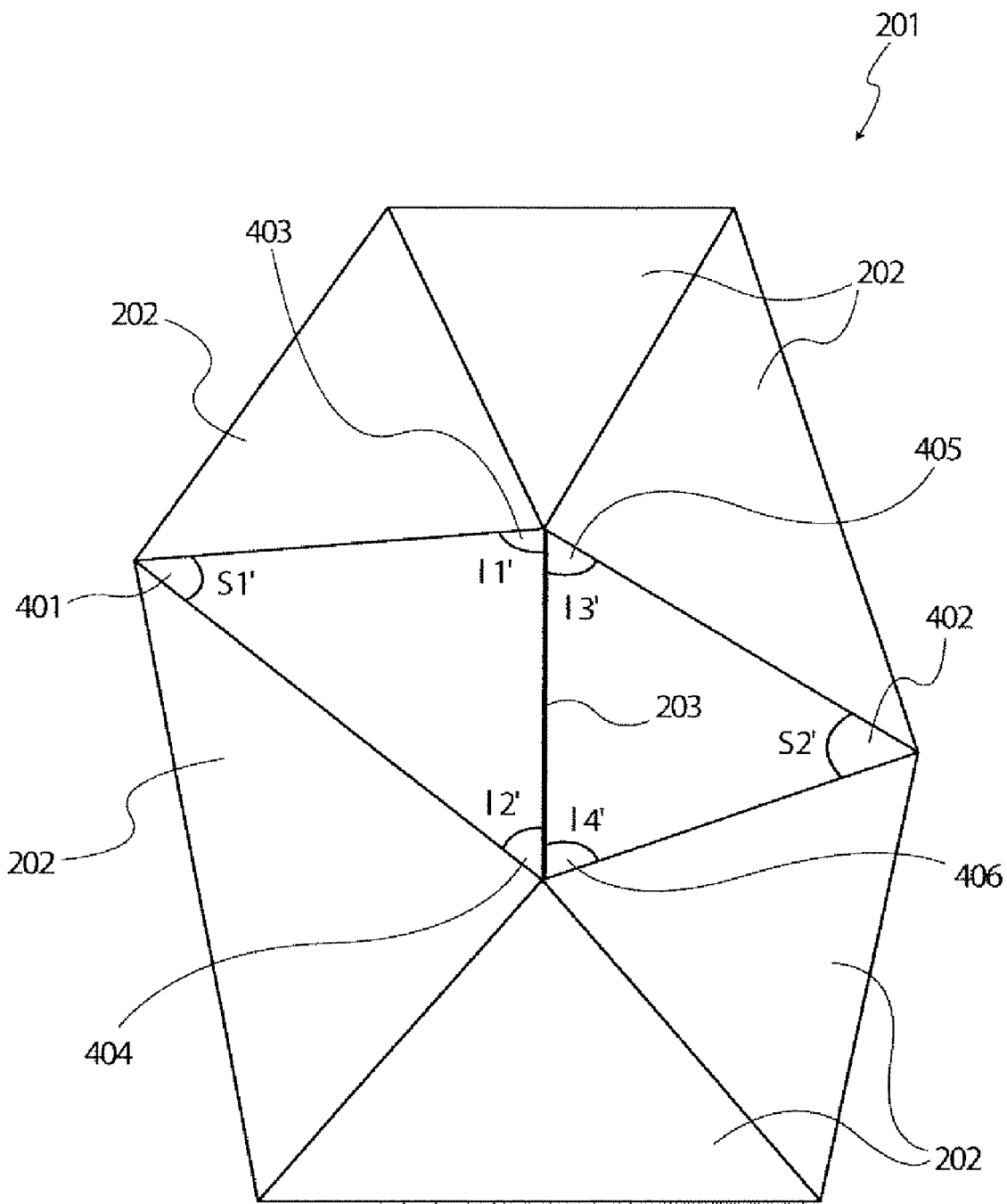
FIG. 4 shows an expanded view of the mesh surface of FIG. 2A.

The same analysis may be applied, for example, to determine if an edge should be contracted. Specifically, FIG. 4 shows the surface of FIG. 2A for which such a determination is desired. Referring to FIG. 4, edge 203 has span angles S1'401 and S2'402 as well as incident angles I1'403-I4'406. In this case, the angles of FIG. 4 have the following values:

TABLE 2

Values for angles for consideration of edge contraction

| Angle | Value |
| --- | --- |
| S1' 401 | 50 degrees |
| S2' 402 | 55 degrees |
| I1' 403 | 80 degrees |
| I2' 404 | 50 degrees |
| I3' 405 | 55 degrees |
| I4' 406 | 70 degrees |

Therefore, S1'+S2'=105 degrees, and C1'+C2'=(I1'+I3')+(I2'+I4')=135 degrees+120 degrees=255 degrees. Thus, S1'+S2'<C1'+C2'and, as a result, edge 203 should be contracted according to Equation 4. The results of such an illustrative edge swap may, once again, be seen by referring to FIG. 2B.

One skilled in the art will recognize that variations on the above criteria for determining whether to swap an edge or contract an edge may be used in place of a direct comparison of the sum of the span angles and cross angles of triangles having an adjacent edge. For example, one illustrative criteria could be defined such that, if both span angles for an edge are greater than a specific angle threshold, such as each angle being greater than 90 degrees, then an edge swap is performed. Alternatively, another threshold test could be illustratively defined such that, if at least one span angle (e.g., span angle S1'401 in FIG. 4) is less then a particular degree threshold while, at the same time, at least one of the two incident angles (e.g., here I1'+I2') associated with that span angle are larger than a particular incident angle threshold, then the edge is contracted.

One skilled in the art will also recognize that, in some cases, an edge swap may be followed by an edge contraction. Specifically, with reference once again to FIGS. 3A and 3B, once an edge swap has been performed, the resulting edge 304 of FIG. 3B may then advantageously be contracted. As discussed herein above, therefore, the determination as to whether such a contraction should be performed would, illustratively, be made according to Equation 4 and according to the discussion herein above.

Other such variations on the threshold for performing an edge swap or an edge contraction in accordance with the principles described herein are also possible. For example, prior to either swapping or contracting an edge a determination as to whether various conditions exist. Specifically, in one illustrative embodiment, a determination is made whether a triangle mesh is a manifold. As one skilled in the art will recognize, a triangular manifold mesh is a mesh that satisfies four general criteria:

1) There is at most one edge linking two points;
2) Two end points of an edge must be different points;
3) No two triangles intersect each other (a common edge between triangles, of course, is allowed); and
4) An edge can be a common edge of, at most, only two adjacent triangles.

Accordingly, prior to edge swap or contraction operations, a determination can illustratively be made whether these 4 criteria are satisfied. Illustratively, if any of the foregoing criteria are not satisfied, then an edge is not contracted and/or is not swapped.

Figure 5:
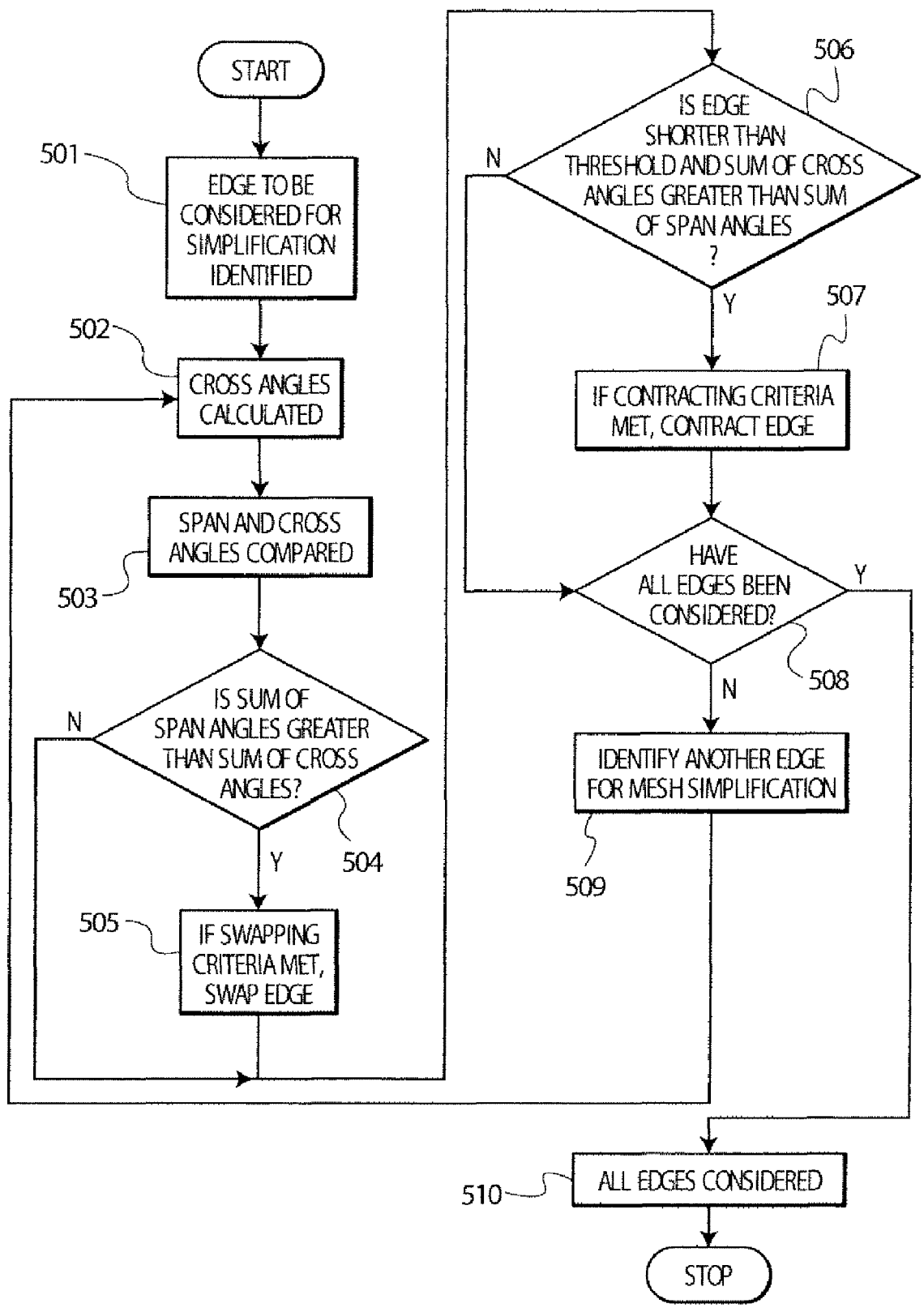
FIG. 5 is a flow chart showing the steps of a method in accordance with an embodiment of the present invention.

FIG. 5 is a flow chart showing the illustrative steps of a method for mesh simplification in accordance with one embodiment of the present invention. Referring to that figure, at step 501 an edge to be considered for mesh simplification is identified. Then, at step 502, the cross angles are calculated as a sum of each pair of adjacent incident angles. Then, at step 503, the span and cross angles associated with the edge are compared. At step 504, a determination is made whether the sum of the span angles is greater than the sum of the cross angles. If so, and if any edge swapping criteria are met, such as the foregoing requirements for a manifold surface, then at step 505 the edge is swapped. If not, or after the edge swap has been performed at step 505, then at step 506, a determination is made whether the edge is shorter than a threshold and whether the sum of the span angles is less than the sum of the cross angles. If so, and if any edge contracting criteria are met, such as, once again, the foregoing criteria for a manifold surface, then at step 507 the edge is contracted. If not, or after the edge contraction is performed at step 507, then at step 508, a determination is made whether any additional edges require consideration and, if so, at step 509, another edge is identified to be considered for mesh geometry improvement or simplification and the process returns to step 502. Otherwise, at step 510 the determination is made that all edges have been considered and the process ends.

Figure 6:
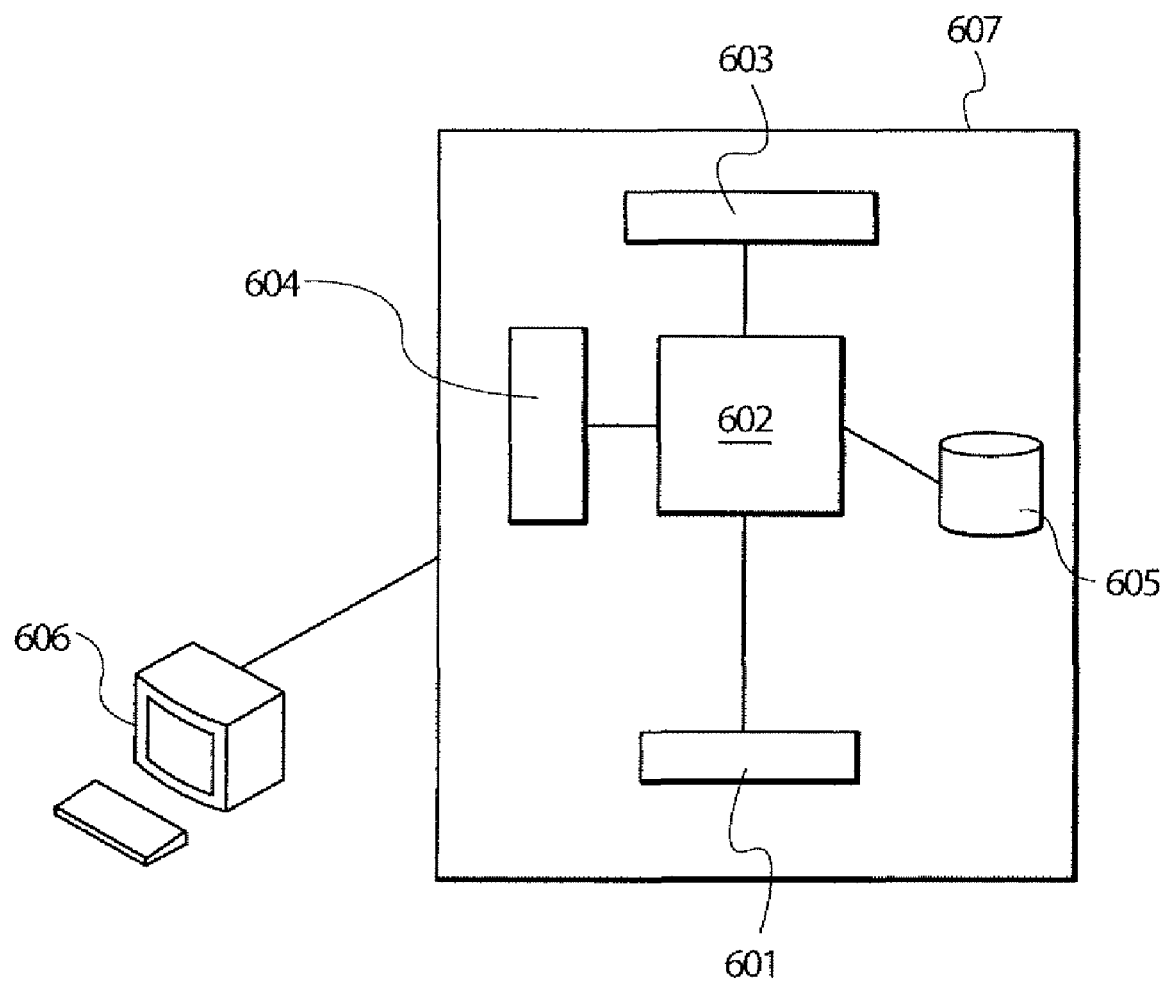
FIG. 6 shows a computer adapted to perform the illustrative steps of the method of FIG. 5 as well as other functions associated with the simplification of triangle mesh surfaces.

The foregoing embodiments are generally described in terms of manipulating objects, such as edges and triangles, in order to simplify a triangle mesh model of a 2D or 3D shape. One skilled in the art will recognize that such manipulations may be, in various embodiments, virtual manipulations accomplished in the memory or other circuitry/hardware of an illustrative computer aided design (CAD) system. Such a CAD system may be adapted to perform these manipulations, as well as to perform various methods in accordance with the above-described embodiments, using a programmable computer running software adapted to perform such virtual manipulations and methods. An illustrative programmable computer useful for these purposes is shown in FIG. 6. Referring to that figure, a CAD system 607 is implemented on a suitable computer adapted to receive, store and transmit data such as the aforementioned positional information associated with the edges and triangles of a triangle mesh model. Specifically, illustrative CAD system 607 may have, for example, a processor 602 (or multiple processors) which controls the overall operation of the CAD system 607. Such operation is defined by computer program instructions stored in a memory 603 and executed by processor 602. The memory 603 may be any type of computer readable medium, including without limitation electronic, magnetic, or optical media. Further, while one memory unit 603 is shown in FIG. 6, it is to be understood that memory unit 603 could comprise multiple memory units, with such memory units comprising any type of memory. CAD system 607 also comprises illustrative modem 601 and network interface 604. CAD system 607 also illustratively comprises a storage medium, such as a computer hard disk drive 605 for storing, for example, data and computer programs adapted for use in accordance with the principles of the present invention as described hereinabove. Finally, CAD system 607 also illustratively comprises one or more input/output devices, represented in FIG. 6 as terminal 606, for allowing interaction with, for example, a technician or database administrator. One skilled in the art will recognize that CAD system 607 is merely illustrative in nature and that various hardware and software components may be adapted for equally advantageous use in a computer in accordance with the principles of the present invention.

One skilled in the art will also recognize that the software stored in the computer system of FIG. 6 may be adapted to perform various tasks in accordance with the principles of the present invention. In particular, such software may be graphical software adapted to import surface models of shapes, for example those models generated from three-dimensional laser scanning of objects. In addition, such software may allow for selective editing of those models in a way that simplifies those models, as described above, or that permits a user to remove various portions of those models as described above. The software of a computer-based system such as CAD system 607 may also be adapted to perform other functions which will be obvious in light of the teachings herein. All such functions are intended to be contemplated by these teachings.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method performed by a processor for simplifying a triangle mesh surface, said surface comprising a first edge, said first edge having a first pair of end points, said method comprising:

comparing by the processor a first value comprising a sum of a plurality of span angles in a first plurality of angles associated with said first edge with a second value comprising a sum of a plurality of cross angles in said first plurality of angles;

if said first value exceeds said second value, replacing said first edge with a second edge having a second pair of end points different than said first pair of endpoints; and if said second value exceeds said first value, contracting said first edge so that said first pair of end points become a single point.

2. The method of claim 1, further comprising:

comparing a third value of one of the span angles to a first threshold value;

comparing a fourth value of a first incident angle associated with said first edge and with said one of the span angles with a second threshold value; and contracting said first edge if said third value is less than said first threshold value and said fourth value is greater than said second threshold value.

3. An apparatus for simplifying a triangle mesh surface, said surface comprising a first edge, said first edge having a first pair of end points, said apparatus comprising:

means for comparing a first value comprising a sum of a plurality of span angles in a first plurality of angles associated with said first edge with a second value comprising a sum of a plurality of cross angles in said first plurality of angles;

means for replacing said first edge with a second edge having a second pair of end points different than said first pair of end points if said first value exceeds said second value; and means for contracting said first edge so that said first pair of end points become a single point if said second value exceeds said first value.

4. The apparatus of claim 3, further comprising:

means for comparing a third value of one of the span angles to a first threshold value;

means for comparing a fourth value of a first incident angle associated with said first edge and with said one of the span angles with a second threshold value; and means for contracting said first edge if said third value is less than said first threshold value and said fourth value is greater than said second threshold value.

5. A non-transitory computer readable medium comprising computer program instructions which, when executed by a processor, define steps for simplifying a triangle mesh surface, said surface comprising a first edge, said first edge having a first pair of end points, said steps comprising:

comparing a first value comprising a sum of a plurality of span angles in a first plurality of angles associated with said first edge with a second value comprising a sum of a plurality of cross angles in said first plurality of angles;

if said first value exceeds said second value, replacing said first edge with a second edge having a second pair of end points different than said first pair of endpoints; and if said second value exceeds said first value, contracting said first edge so that said first pair of end points become a single point.

6. The computer readable medium of claim 5, said computer readable medium further comprising computer program instructions defining the steps of:

comparing a third value of one of the span angles to a first threshold value;

comparing a fourth value of a first incident angle associated with said first edge and with said one of the span angles with a second threshold value; and contracting said first edge if said third value is less than said first threshold value and said fourth value is greater than said second threshold value.

7. A method for simplifying a triangle mesh surface performed by a processor, said surface comprising a first edge having a first pair of end points, said method comprising:

comparing by a processor a first value of a first span angle associated with said first edge with a first threshold value;

comparing a second value of a second span angle associated with said first edge with the first threshold value;

if said first and second values exceed said first threshold value, replacing said first edge with a second edge having a second pair of end points different than said first pair of endpoints; and if at least one of the first and second values does not exceed said first threshold value and a third value associated with at least one incident angle associated with said first edge exceeds a second threshold, contracting said first edge so that said first pair of end points become a single point.

8. The method of claim 7 wherein the threshold value is 90 degrees.

9. The method of claim 7 wherein the second pair of end points correspond to a first apex of the first span angle and a second apex of the second span angle.

\* \* \* \* \*